US008028235B2

(12) United States Patent
Lin

(10) Patent No.: US 8,028,235 B2
(45) Date of Patent: Sep. 27, 2011

(54) MULTI-WINDOWS COLOR ADJUSTMENT SYSTEM AND METHOD

(75) Inventor: Wan-Shui Lin, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 473 days.

(21) Appl. No.: 12/003,958

(22) Filed: Jan. 3, 2008

(65) Prior Publication Data

US 2010/0122042 A1 May 13, 2010

(30) Foreign Application Priority Data

Apr. 27, 2007 (TW) ............................... 96114916 A

(51) Int. Cl.
*G06F 3/048* (2006.01)

(52) U.S. Cl. ......... 715/722; 345/549; 711/154; 715/781

(58) Field of Classification Search ........................ None
See application file for complete search history.

(56) References Cited

U.S. PATENT DOCUMENTS 6,630,945 B1 * 10/2003 MacInnis et al. ............. 715/768
2006/0282867 A1 * 12/2006 Mizuhashi et al. ........... 725/105

* cited by examiner

*Primary Examiner* — Gary Portka
(74) *Attorney, Agent, or Firm* — Jianq Chyun IP Office

(57) ABSTRACT

The invention provides a multi-windows color adjustment system and method that divides the picture frame of a display screen into three or more windows so that the user can compare the color tones of the windows and then select the preferred window. The multi-windows color adjustment system includes a memory read/write controller coupled to an image data input for temporarily storing an input image data and executing read/write control, a window control unit coupled to the memory read/write controller for executing size, data flow and color tone controls of the windows, a line buffer coupled to the memory read/write controller and the window control unit for storing a line data, and a color adjustment unit coupled to the window control unit and the line buffer for executing the processing of color adjustment of the image data in the windows subject to the control of the window control unit.

13 Claims, 5 Drawing Sheets

MULTI-WINDOWS COLOR ADJUSTMENT SYSTEM AND METHOD

BACKGROUND OF THE INVENTION

1. Field of the Invention

The present invention relates to a color adjustment system and method and more particularly, to a multi-window color adjustment system and method that divides the picture frame of a display screen into three or more windows so that the user can compare the color tones of the windows and then select the preferred window.

2. Description of the Related Art

A regular TV set provides a color adjustment system for allowing the user to adjust the preferred color tones. In an old design TV set, the user can use the remote controller or adjustment knobs of the TV set to adjust different color parameters such as contrast, brightness, hue, color saturation, and etc. During adjustment, the TV set displays the adjusted color tone and the parameter ratio by means of a bar chart for reference. An advanced TV set provides preset color templates for selection by the user, including the color tone modes of Dynamic, Standard, Movie, and Nature. The user can use the remote controller to select the color parameters conveniently.

However, when using the aforesaid TV color adjustment system, the user can compare the color parameters simply by means of memory. When browsing posterior color tone options, the user may be unable to memorize the former color tone options for comparison. Therefore, this conventional color adjustment method is inconvenient and not practical for real time comparison.

Therefore, it is desirable to provide a multi-windows color adjustment system and method that eliminates the aforesaid problem.

SUMMARY OF THE INVENTION

The present invention has been accomplished under the circumstances in view. It is one object of the present invention to provide a multi-window color adjustment system and method that divides the picture frame of a display screen into three or more windows so that the user can compare the color tones of the windows and then select the preferred window.

It is another object of the present invention to provide a multi-window color adjustment system and method that uses a line buffer to write image data from a memory into multiple windows by means of repeated reading, thereby saving hardware cost.

To achieve these and other objects of the present invention, the multi-windows color adjustment system is adapted for dividing the picture frame of a display screen into at least three windows so that the user can compare the color parameters of the windows and then select the preferred window, and comprising: a memory read/write controller coupled to an image data input for temporarily storing an input image data and executing read/write control, a window control unit coupled to the memory read/write controller for executing size, data flow and color tone controls of the windows, a line buffer coupled to the memory read/write controller and the window control unit for storing a line data, and a color adjustment unit coupled to the window control unit and the line buffer for executing the processing of color adjustment of the image data in the windows subject to the control of the window control unit.

To achieve these and other objects of the present invention, the multi-windows color adjustment method comprises the steps of: dividing the picture frame of a display screen into at least three windows; giving each of the windows a respective predetermined color parameter; and the user selecting the preferred window after compared the color parameters of every window on the display screen.

DETAILED DESCRIPTION OF THE PREFERRED EMBODIMENT

Figure 1:
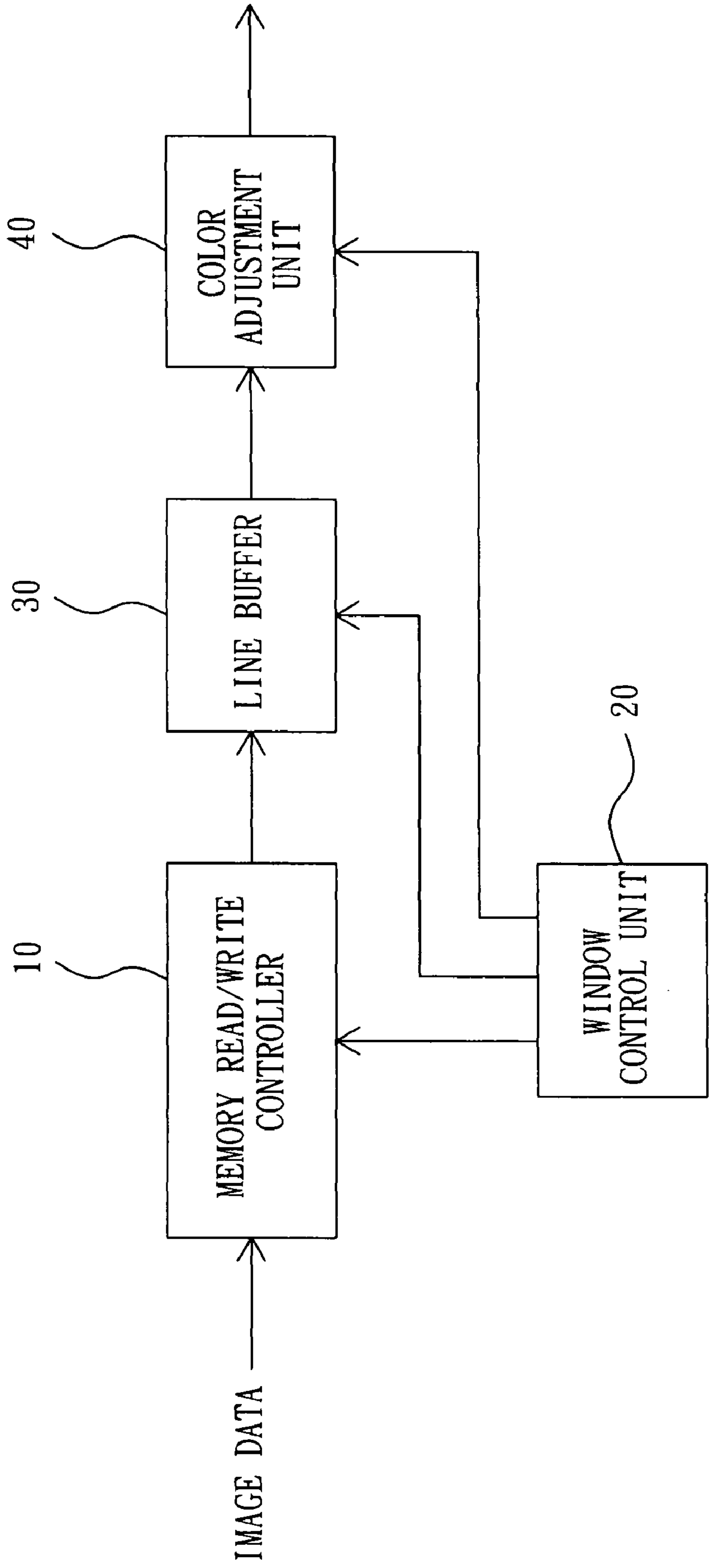
FIG. 1 is a block diagram of a multi-windows color adjustment system in accordance with the present invention.
Figure 2:
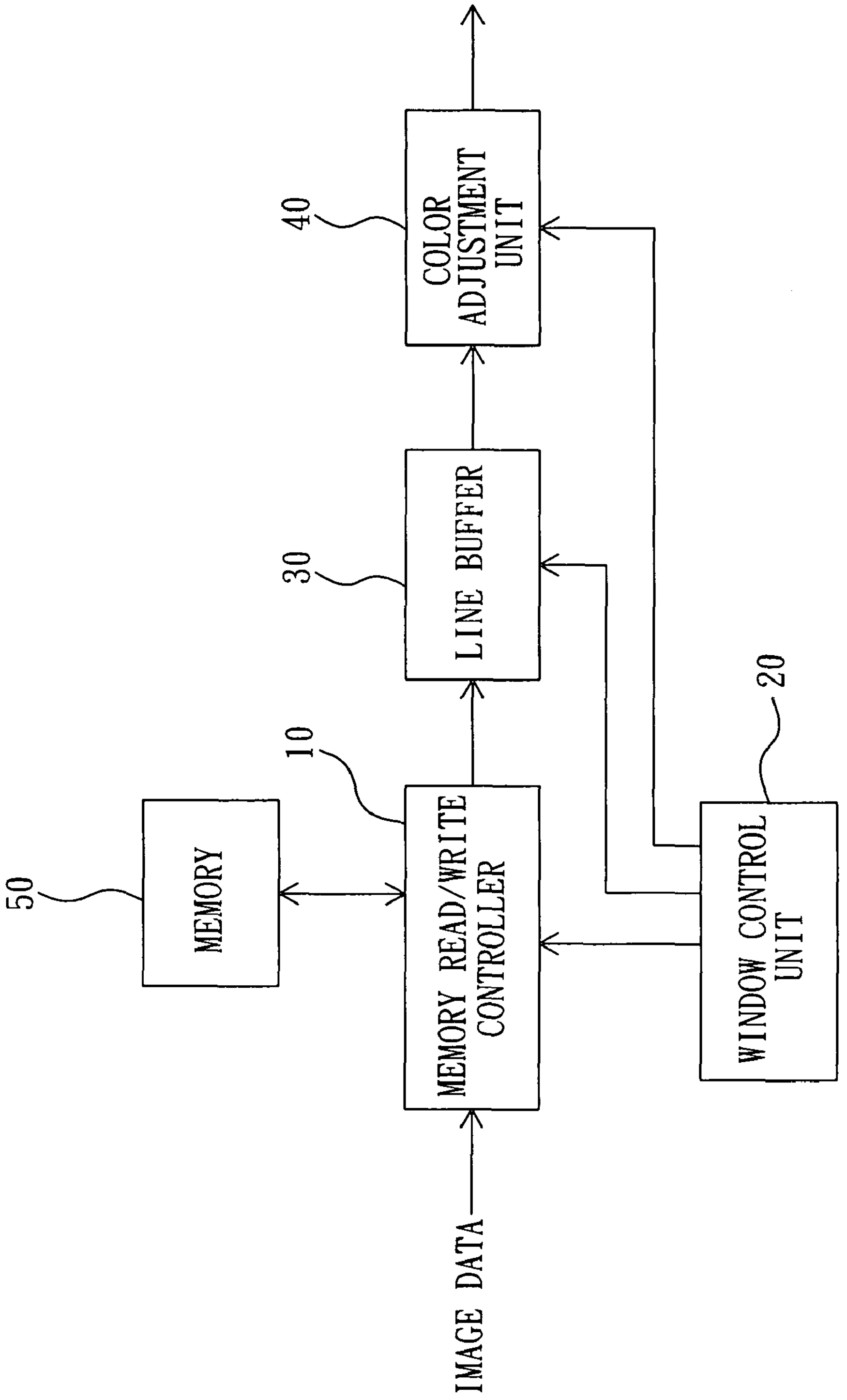
FIG. 2 corresponds to FIG. 1, showing a memory added to the multi-windows color adjustment system.
Figure 3:
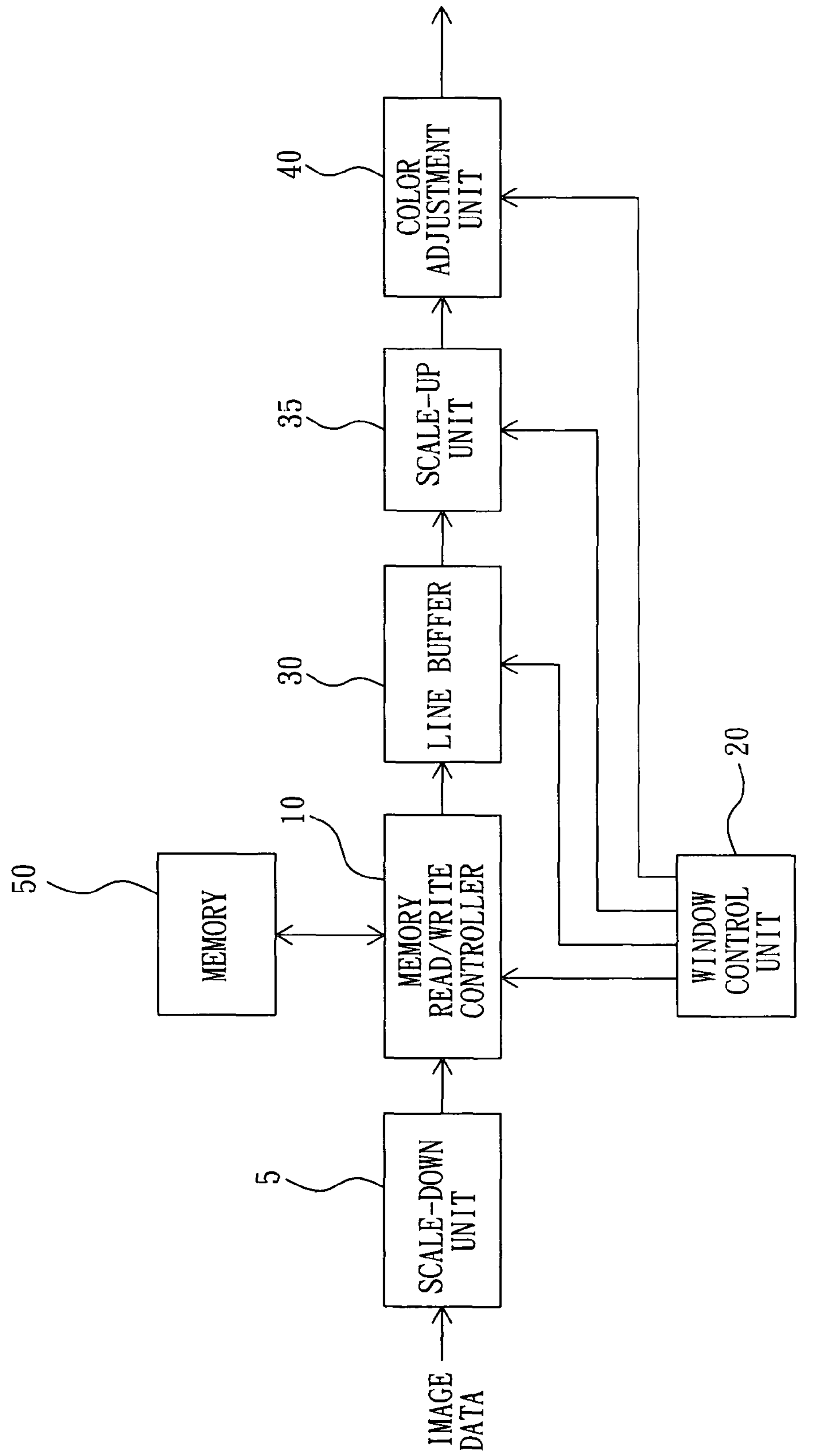
FIG. 3 corresponds to FIG. 2, showing an image scale-up unit and an image scale-down unit added to the multi-windows color adjustment system.
Figure 4:
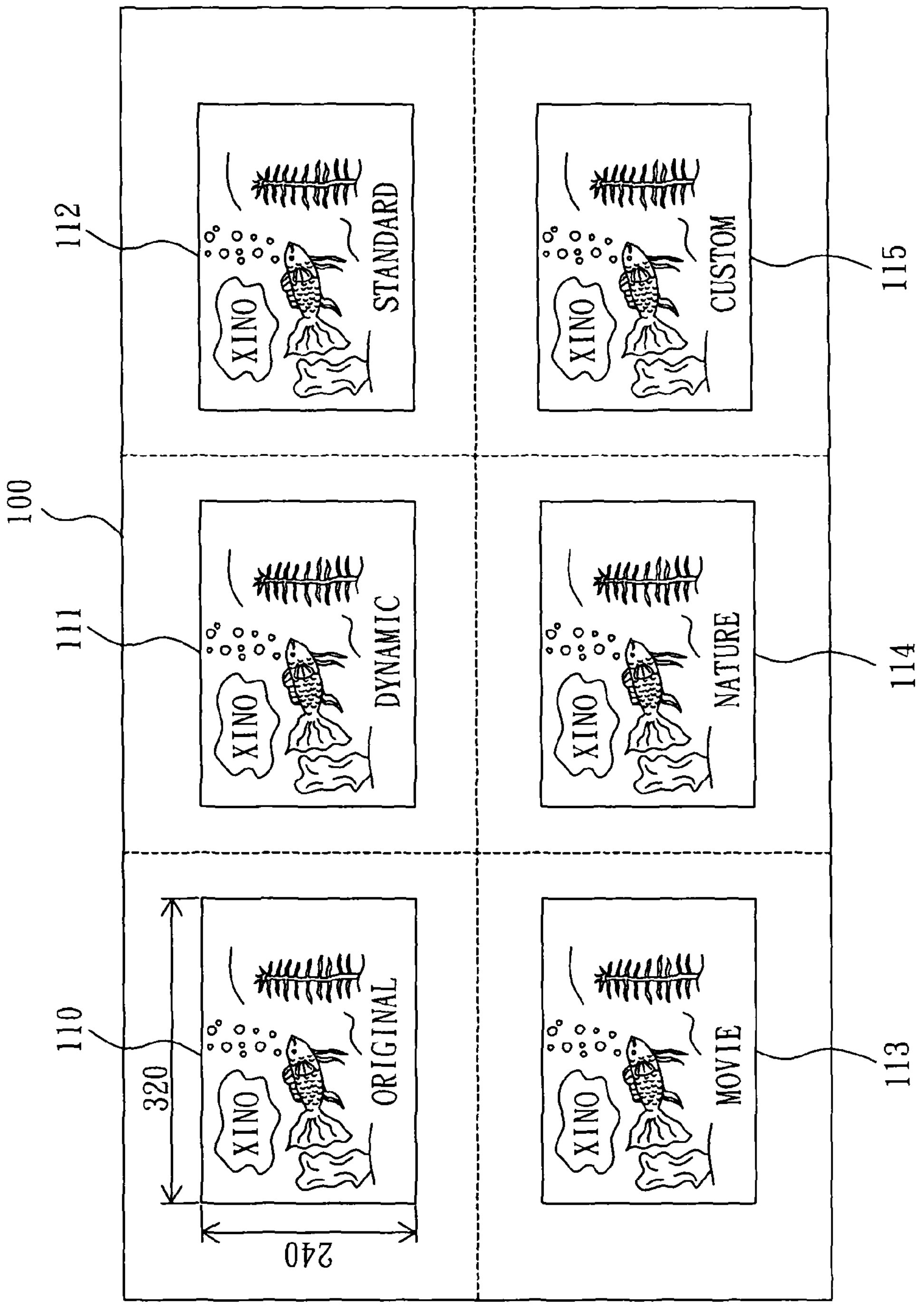
FIG. 4 is a schematic drawing showing a picture frame divided into six windows subject to the operation of the multi-windows color adjustment system in accordance with the present invention.

Please refer to FIGS. 1~4 in which FIG. 1 is a block diagram of a multi-windows color adjustment system in accordance with the present invention; FIG. 2 corresponds to FIG. 1, showing a memory added to the multi-windows color adjustment system; FIG. 3 corresponds to FIG. 2, showing an image zoom out unit and an image zoom in unit added to the multi-windows color adjustment system; FIG. 4 is a schematic drawing showing a picture frame divided into six windows subject to the operation of the multi-windows color adjustment system in accordance with the present invention.

The invention uses the multi-windows color adjustment system to divide the normal picture frame of a display screen 100 into at least three, for example, six windows 110~115, so that the user can compare the color parameters of the windows 110~115 and then select the preferred window for display. The display screen 100 can be a big size flat-panel display, for example, LCD or plasma display device.

As illustrated in FIG. 1, the multi-windows color adjustment system comprises a memory read/write controller 10, a window control unit 20, a line buffer 30, and a color adjustment unit 40.

The memory read/write controller 10 is coupled to an image data input for temporarily storing the input image data and executing read/write control. The input image data can be TV video, HDTV video, PC video, DVD video, or VCR video.

The window control unit 20 is coupled to the memory read/write controller 10 for executing size, data flow and color tone controls of the windows 110~115. The window control unit 20 further defines the start point address and end point address of each of the windows 110~115 (see FIG. 4). Further, the window control unit 20 has a programmable function. By means of this programmable function, the window control unit 20 controls zoom level of the windows 110~115. By means of a remote controller or human-machine interface (not shown), the user can execute programming and control of each of the windows 110~115.

The line buffer 30 is coupled to the memory read/write controller 10 and the window control unit 20 for storing a line data. The line buffer 30 writes image data from a memory (see FIG. 2) into the windows 110~115 by means of repeated reading. The capacity of the line buffer 30 is determined subject to the definition of the display screen 100. For example, the capacity of the line buffer 30 can be 1366×3 bytes or 1920×3 bytes for an ordinary LCD panel display screen 100 greater than 32 inches.

The color adjustment unit 40 is coupled to the window control unit 20 and the line buffer 30 for executing the processing of color adjustment of the image data in the windows 110~115 subject to the control of the window control unit 20.

Referring to FIG. 2, a memory 50 is coupled to the memory read/write controller 10 for storing the input image data. Further, the memory read/write controller 10 can execute the control of read/write sequence of assigned zones of the memory 50. If the multi-windows color adjustment system is adapted to divide the display screen 100 into three windows 110~112, the add memory 50 is not necessary. If the multi-windows color adjustment system is adapted to divide the display screen 100 into 6 windows 110~115, the add memory 50 is necessary for storing the image data. The memory 50 can be a SRAM (static random access memory), DRAM (dynamic random access memory), or DDR (double data rate SDRAM).

Referring to FIG. 3, the multi-windows color adjustment system further comprises an image scale-down unit 5 and an image scale-up unit 35. The image scale-down unit 5 is disposed between the image data input and the memory read/write controller 10 and coupled to the window control unit 20 for scaling down the input image data for loading into the windows 110~115 subject to the control of the window control unit 20. The scale ratio can be 1:1 or smaller to save the space of the memory 50. The image scale-up unit 35 is disposed between the line buffer 30 and the color adjustment unit 40 and coupled to the window control unit 20 for scaling up the input image data for loading into the windows 110~115 subject to the control of the window control unit 20. The image scale-up unit 35 scales up the image data subject to the scale ratio of the image scale-down unit 5.

Referring to FIG. 4, if the definition of the display screen 100 is 1366×768 and the multi-windows color adjustment system divides the picture frame of the display screen 100 into 6 windows 110~115, the first window 110 displays the color tone mode of Original, the second window 111 displays the color tone mode of Dynamic, the third window 112 displays the color tone mode of Standard, the fourth window 113 displays the color tone mode of Movie, the fifth window 114 displays the color tone mode of Nature, and the sixth window 115 displays the color tone mode of Custom. The window control unit 20 processes picture division subject to the definition of the display screen 100. By means of the image scale-down unit 5, the window control unit 20 divides the picture frame into 6 windows 110~115 having the definition of 320×240. The background is put around the windows 110~115. According to the present preferred embodiment, the window 110 that displays the color tone mode of Original is on the far left side, and the window 115 that displays the color tone mode of Custom is on the far right side or lower right side convenient for adjustment by the user.

During operation, the window control unit 20 informs the line buffer 30 of the start point address and end point address of each of the windows 110~115, for example, the start point of the first window 110 is at the $68^{th}$ pixel and its end point is at the $387^{th}$ pixel (total 320 pixels), and the area from $0^{th}$ pixel through $67^{th}$ pixel and $388^{th}$ pixel through $455^{th}$ pixel is for the background. The start point of the window 110 is at the $524^{th}$ pixel and its end point is at the $843^{rd}$ pixel (total 320 pixels), and the area from $456^{th}$ pixel through $523^{rd}$ pixel and $844^{th}$ pixel through $911^{th}$ pixel is for the background, and so on. The line buffer 30 fetches the image data of a first line (in horizontal direction) from the memory 50 and fills it into the space from $68^{th}$ pixel through $387^{th}$ pixel in the first window 110, and then resets the line counter, and then returns to the memory 50 to fetch the image data of a second line (in horizontal direction) for filling into the first window 110, and so on. After repeated 240 times of the action, the first window 110 is filled up with the image data. Thereafter, the line buffer 30 works to fill up the windows 111~115 with the same image data.

At this time, the user can view the image data of the color tone modes of Original/Dynamic/Standard/Movie/Nature/Custom through the windows 110~115. After comparison, the user can use the remote controller or human-machine interface (not shown) to select the preferred color parameters. If the user does not like the color tone modes of Original/Dynamic/Standard/Movie/Nature/Custom of the windows 110~114, the user can use the remote controller or human-machine interface to adjust the color parameters, for example but not limited to, contrast, brightness, hue, saturation, 3D array conversion, DRC and Gamma function correction etc. The sixth window 115 displays the image data subject to the user's adjustment till satisfaction.

At final, the user uses the remote controller or human-machine interface to enter the selection of the preferred window 110~115, for example, the first window 110 that displays the color tone mode of Original. At this time, the window control unit 20 controls the color adjustment unit 40 to execute adjustment of the color parameters for the color tone mode of Original, and simultaneously controls the image scale-up unit 35 to scale up the image data, and therefore the picture of the display screen 100 displays the image data of the color tone mode of Original. Therefore, the multi-windows color adjustment system of the present invention can divide the picture frame of the display screen 100 into at least three windows 110~115 to show the image data in different color parameters for preference selection, improving the shortcomings of the conventional techniques.

Figure 5:
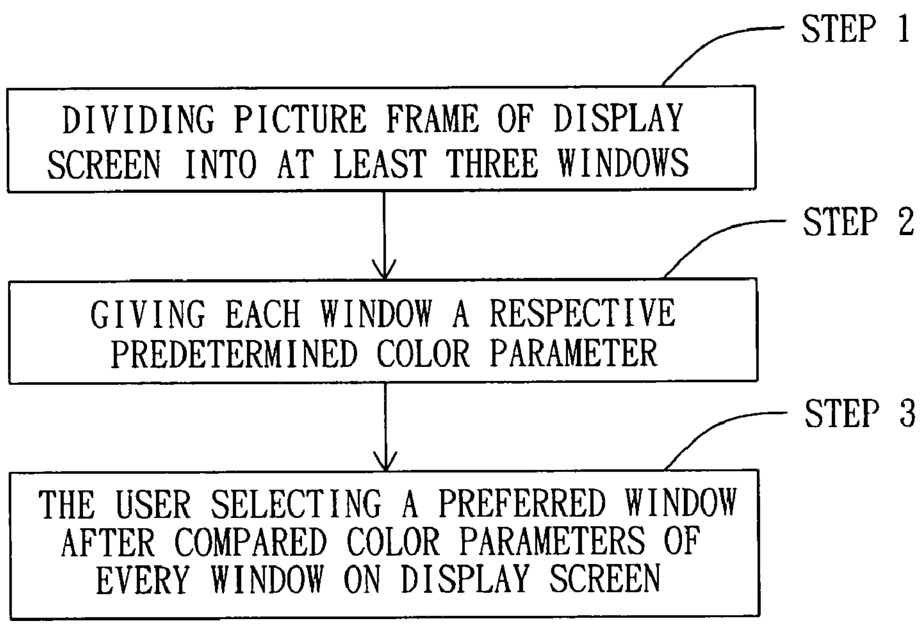
FIG. 5 is a flow chart of a multi-windows color adjustment method in accordance with the present invention.

FIG. 5 is a flow chart of a multi-windows color adjustment method in accordance with the present invention. As illustrated, the multi-windows color adjustment method includes the steps of: 1) divide a display screen 100 into at least three windows, 2) give a respective predetermined color parameter to each window, and 3) the user selects the preferred window after compared the color parameters of every window 110~115 on the display screen 100.

During step 1) divide a display screen 100 into at least three windows, in which the display screen 100 can be a flat panel display, for example, LCD or plasma display device, and the picture frame of the display screen 100 is divided into at least three windows 110~115.

During step 2) give a respective predetermined color parameter to each window, in which the window 110 displays the color tone mode of Original, the window 111 displays the color tone mode of Dynamic, the window 112 displays the color tone mode of Standard, the window 113 displays the color tone mode of Movie, the window 114 displays the color tone mode of Nature, and the window 115 displays the color tone mode of Costum.

During step 3) the user selects the preferred window after compared the color parameters of every window 110~115 on the display screen 100, in which the user can view the image data of the color tone modes of Original/Dynamic/Standard/Movie/Nature/Custom of the windows 110~115, and then selects the preferred color tone mode of by means of the remote controller or human-machine interface (not shown). If the user does not like the color tone modes of Original/Dynamic/Standard/Movie/Nature of the windows 110~114, the user can use the remote controller or human-machine interface to adjust the color parameters, for example but not limited to, contrast, brightness, hue, saturation, 3D array conversion, DRC and Gamma function correction, and etc. The sixth window 115 displays the image data subject to the user's adjustment till satisfaction. Therefore, the multi-windows color adjustment method of the present invention can divide the picture frame of the display screen 100 into at least three windows 110~115 to show the image data in different color parameters for preference selection, improving the shortcomings of the conventional techniques.

As indicated above, the multi-windows color adjustment system and method of the present invention can divide the picture frame of a display screen into at least three windows to show the image data in different color tone modes for comparison and preference selection, improving the shortcomings of the color adjustment system of conventional television sets.

Although a particular embodiment of the invention has been described in detail for purposes of illustration, various modifications and enhancements may be made without departing from the spirit and scope of the invention.

What is claimed is:

1. A multi-windows color adjustment system for dividing the picture frame of a display screen into at a plurality of windows so that a user compares color parameters of the windows and then selects a preferred window, the multi-windows color adjustment system comprising:

a memory read/write controller coupled to an image data input for temporarily storing an input image data and executing read/write control;

a window control unit coupled to said memory read/write controller for executing size and data flow of the windows, wherein at least two windows of the windows are provided with different respective predetermined color parameters, another window of the windows is provided with a color parameter of original color tone mode for reference, and further another window of the windows is provided with a preferred color parameter of custom mode for enabling the user to adjust the preferred color parameter;

a line buffer coupled to said memory read/write controller and said window control unit for storing a line data; and a color adjustment unit coupled to said window control unit and said line buffer for executing the processing of color adjustment of the image data in the windows subject to the control of said window control unit.

2. The multi-windows color adjustment system as claimed in claim 1, further comprising a memory coupled to said memory read/write controller for storing the input image data in which said memory read/write controller executes the control of read/write sequence of assigned zones of the memory.

3. The multi-windows color adjustment system as claimed in claim 1, wherein said window control unit denies the start point address and end point address of each of the window, and has a programmable function for enabling the user to execute programming and control of each of the windows by means of a remote controller.

4. The multi-windows color adjustment system as claimed in claim 2, wherein said line buffer writes the image data from said memory into the windows by means of repeated reading, and the capacity of said line buffer is determined subject to the definition of said display screen.

5. The multi-windows color adjustment system as claimed in claim 1, further comprising an image scale-down unit disposed between the image data input and said memory read/write controller and coupled to said window control unit for scaling down the input image data for loading into the windows subject to the control of said window control unit.

6. The multi-windows color adjustment system as claimed in claim 5, further comprising an image scale-up unit disposed between said line buffer and said color adjustment unit and coupled to said window control unit for scaling up the input image data for loading into the windows subject to the control of said window control unit.

7. The multi-windows color adjustment system as claimed in claim 1, wherein said color adjustment unit is capable of executing adjustment of at least one of contrast, brightness, hue, saturation, 3D array conversion, DRC and Gamma function correction.

8. The multi-windows color adjustment system as claimed in claim 1, wherein the input image data is at least one of TV video, HDTV video, PC video, DVD video, or VCR video.

9. A multi-windows color adjustment method comprising the steps of:

dividing the picture frame of a display screen into a plurality of windows;

providing at least two of the windows with different respective predetermined color parameters, providing another window of the windows with a color parameter of original color tone mode for reference, and providing further another window of the windows with a preferred color parameter of custom mode for enabling a user to adjust the preferred color parameter; and displaying a preferred window selected from the windows by the user after the user compares the color parameters of every window on the display screen.

10. The multi-windows color adjustment method as claimed in claim 9, wherein during the step of displaying the preferred window selected from the windows by the user after the user compares the color parameters of every window on the display screen, the multi-windows color adjustment method further comprises providing a remote controller or a human-machine interface for the user to execute the programming of each of the windows and selection of the preferred window.

11. The multi-windows color adjustment method as claimed in claim 9, wherein the predetermined color parameter comprises at least one of contrast, brightness, hue, saturation, 3D array conversion, DRC and Gamma function correction.

12. A multi-windows color adjustment system comprising:

a window control unit for dividing a picture frame of a display screen into a plurality of windows, providing at least two of the windows with different respective predetermined color parameters, providing another window of the windows with a color parameter of original color tone mode for reference, and providing further another window of the windows with a preferred color parameter of custom mode for enabling a user to adjust the preferred color parameter, so that the user compares the color parameters of the windows and then selects a preferred window of the multi-windows color adjustment system.

13. The multi-windows color adjustment system as claimed in claim 12, further comprising:

a memory read/write controller coupled to an image data input for temporarily storing an input image data and executing read/write control, wherein the window control unit is coupled to said memory read/write controller for executing size and data flow of the windows;

a line buffer coupled to said memory read/write controller and said window control unit for storing a line data; and a color adjustment unit coupled to said window control unit and said line buffer for executing the processing of color adjustment of the image data in the windows subject to the control of said window control unit.

* * * * *